United States Patent
Shih et al.

(10) Patent No.: US 10,416,655 B2
(45) Date of Patent: Sep. 17, 2019

(54) MACHINING METHODS FOR MACHINE TOOLS WITH IN-PROCESS VERIFICATION

(71) Applicants: Chiao-Chin Shih, ChangHua (TW); Tsung-Yu Shih, ChangHua (TW)

(72) Inventors: Chiao-Chin Shih, ChangHua (TW); Tsung-Yu Shih, ChangHua (TW)

(*) Notice: Subject to any disclaimer, the term of this patent is extended or adjusted under 35 U.S.C. 154(b) by 198 days.

(21) Appl. No.: 15/171,440

(22) Filed: Jun. 2, 2016

(65) Prior Publication Data
US 2017/0205805 A1    Jul. 20, 2017

(30) Foreign Application Priority Data
Jan. 15, 2016    (TW) ............................. 105101342 A

(51) Int. Cl.
*G05B 19/4097*    (2006.01)
*G06F 3/0484*    (2013.01)
*G06Q 10/06*    (2012.01)

(52) U.S. Cl.
CPC ..... *G05B 19/4097* (2013.01); *G06F 3/04842* (2013.01); *G06F 3/04847* (2013.01); *G06Q 10/0631* (2013.01); *G06Q 10/06316* (2013.01); *G05B 2219/35012* (2013.01)

(58) Field of Classification Search
CPC ...... G05B 19/4097; G05B 2219/35012; G06Q 10/06316; G06Q 10/0631; G06F 3/04842; G06F 3/04847
See application file for complete search history.

(56) References Cited

U.S. PATENT DOCUMENTS

| | | | | |
|---|---|---|---|---|
| 5,208,763 A | * | 5/1993 | Hong .................. | G05B 19/402 700/192 |
| 2004/0073359 A1 | * | 4/2004 | Ichijo ................... | B66F 9/0755 701/50 |
| 2009/0326680 A1 | * | 12/2009 | Landgraf ............. | G05B 19/042 700/49 |
| 2011/0130854 A1 | * | 6/2011 | Lettenbauer ........ | B29C 33/3835 700/98 |
| 2011/0282492 A1 | * | 11/2011 | Krause .................. | B25J 9/1664 700/259 |
| 2013/0276280 A1 | * | 10/2013 | Wielens ................ | B23Q 17/22 29/407.04 |
| 2014/0157610 A1 | * | 6/2014 | Garvey ................. | G01B 21/04 33/503 |
| 2016/0109876 A1 | * | 4/2016 | Addicott ............ | G05B 19/4099 700/98 |
| 2016/0327935 A1 | * | 11/2016 | Kawai ................ | G05B 19/4065 |

* cited by examiner

*Primary Examiner* — Nathan L Laughlin
(74) *Attorney, Agent, or Firm* — Jackson IPG PLLC; Demian K. Jackson

(57) ABSTRACT

Machining methods for machine tools where a workpiece can be manually moved by an operator or by automatic operation. A drawing file is displayed on a screen and machining is performed. An evaluation is performed to determine if the processed points of the workpiece match the desired processing coordinates within a tolerance range. Accordingly, the system is selectively activated to prevent processing at incorrect processing points or deviating from the tolerance range of the desired processing points. Processing yield rate is improved and all processing points are monitored by the system and displayed on a drawing file screen.

3 Claims, 11 Drawing Sheets

MACHINING METHODS FOR MACHINE TOOLS WITH IN-PROCESS VERIFICATION

FIELD OF THE INVENTION

The present invention relates to a processing machine, and more particularly to a processing method for processing machine.

BACKGROUND OF THE INVENTION

Please refer to FIG. 1, the steps of a conventional processing method for processing machine may comprise: entering a main screen (step SA1); preparing before processing, such as setting hardware (work pieces), parameters, processing coordinates, and depths (step SA2); operating by operator (step SA3) to position for processing; starting to process at corresponding processing points (step SA4); judging if the processing is finished (step SA5); if no, continue judging; if yes, stop processing or set to automatically stop processing (step SA6); checking if all processing points are finished processing by operators (step SA7); if no, go back to step SA3; if yes, stop this process.

The above mentioned method is judged the processing position and the level of completion by operator while processing. If the judgment is failed, it is easy to result in deviation of the processing position and increasing yield rate. Accordingly, the problem or drawback of the conventional processing method for processing machine is operator error which is hard to avoid.

Accordingly, the inventor of the present invention has devoted himself based on his many years of practical experiences to solve this problem.

SUMMARY OF THE INVENTION

In order to solve above mentioned problems, the primary object of the present invention is to provide a processing method of processing machine. The operator may shift or move the work piece waited for processing by hand or operated in the automatic mode. A drawing file screen of a main screen may be used and the system of the processing machine may be applied to judge to know if the processing points of the work piece waited for processing and the processing coordinates wanted to process are in the tolerance range. Accordingly, the system of the processing machine is activate to process so as to prevent from processing at wrong processing points or deviating from the tolerance range of the processing points wanted to process. It may make sure that the processing yield rate is improved and further make sure that all processing points may truly be finished processing which is monitored by the system and displayed on the drawing file screen of the main screen.

In order to achieve the above object, the processing method of the processing machine of the present invention, the steps may comprise:

a mode selection step: displaying a main screen on a monitor of a system and selecting and entering a drawing file screen on the main screen;

a setting step: setting a reference point preset on the drawing file screen to match a reference point of a work piece waited for processing, selecting a processing file which is stored a plurality of processing coordinates, setting a plurality of processing points on the work piece waited for processing, checking if the preset reference point and the reference point of the work piece waited for processing are matched before operating preliminarily by operator, checking if the processing file is correct; and checking if the processing coordinates are correct;

a shifting step: shifting the work piece waited for processing so that each of the processing points is shifted to the corresponding processing coordinate, the shift of the work piece is detected by the system in the drawing file screen and a shift direction thereof is displayed on the monitor so that the processing point and the corresponding processing coordinate are overlapped and matched to prevent from misjudging or reading wrong coordinate value;

an activating step: pressing a processing switch to transmit an activating signal to a system processor of the system to activate a processing step;

a first checking step: checking if the work piece waited for processing is matched at a right position which is one of the processing coordinates; if no, showing an error message on the main screen and the processing is not performed, and the shifting step must be finished by an operator; if yes, go to next step;

the processing step: the system starts to instruct to process the work piece waited for processing;

a second checking step: checking if the system finishes the processing while the work piece waited for processing is processed at the corresponding processing coordinate; if no, go back to the processing step; if yes, go to next step;

a stop step: stopping the processing of the system of the processing machine;

a third checking step: checking if the processing coordinates of the processing file and the corresponding processing points of the work piece waited for processing are all finished processing; if no, go back to the shifting step; if yes, go to next step; and displaying an all processing finished message on the drawing file screen of the main screen.

In some embodiments, the processing coordinates may change colors to confirm the machine is ready for machining, otherwise the system may not activate the processing step, while the processing point of the work piece waited for processing is shifted to the corresponding processing coordinate in the shifting step.

In some embodiments, a kind of position feedback device of the system is an optical encoder, an encoder, or a step motor, and a signal of shifting direction on the drawing file screen is transmitted to the kind of position feedback device through a system interface, and then a shifting status is displayed on the monitor by the system processor.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
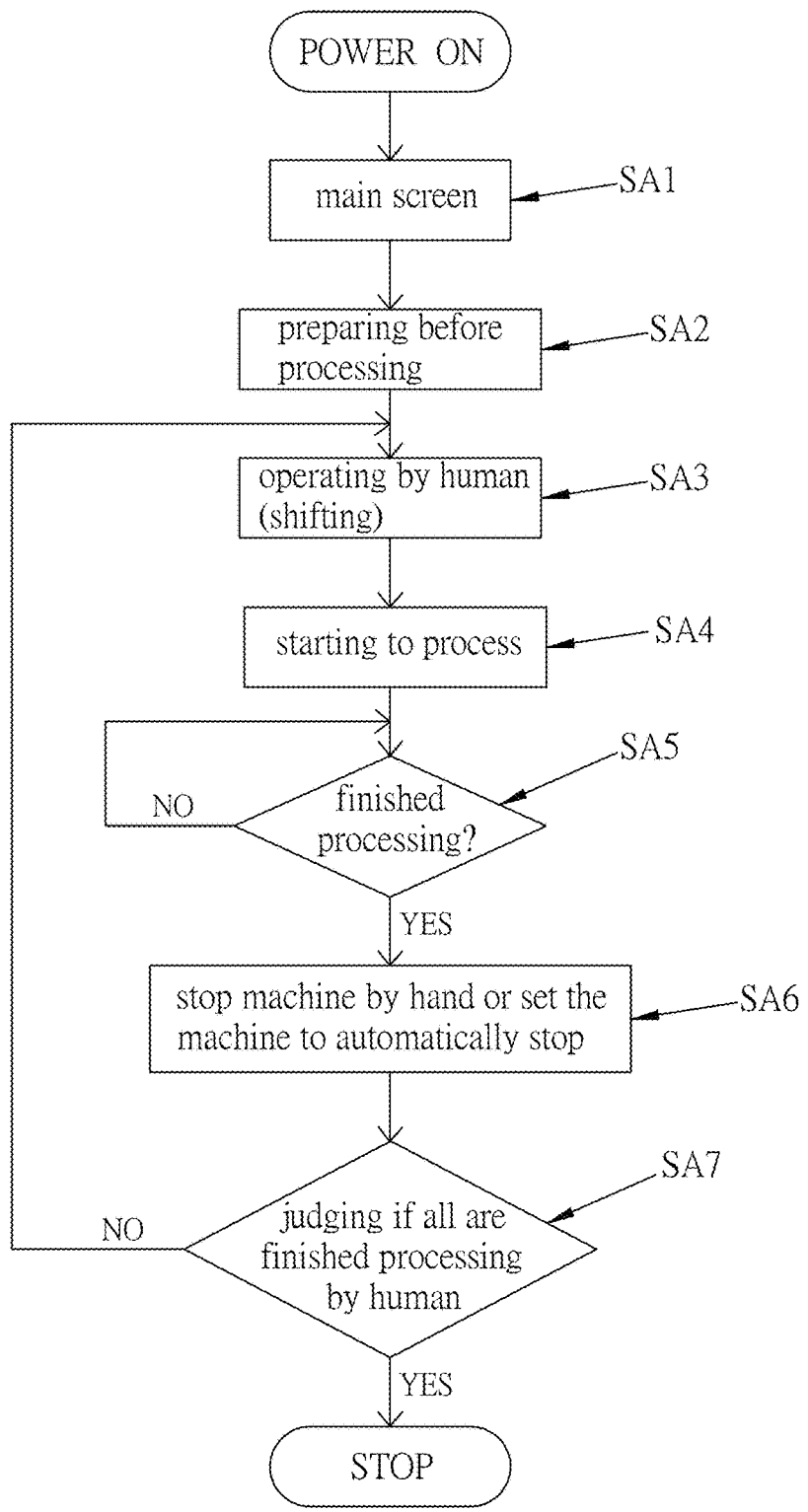
FIG. 1 is a flow chart of a conventional processing method for processing machine.

Referring now to the drawings where like characteristics and features among the various figures are denoted by like reference characters.

Figure 2:
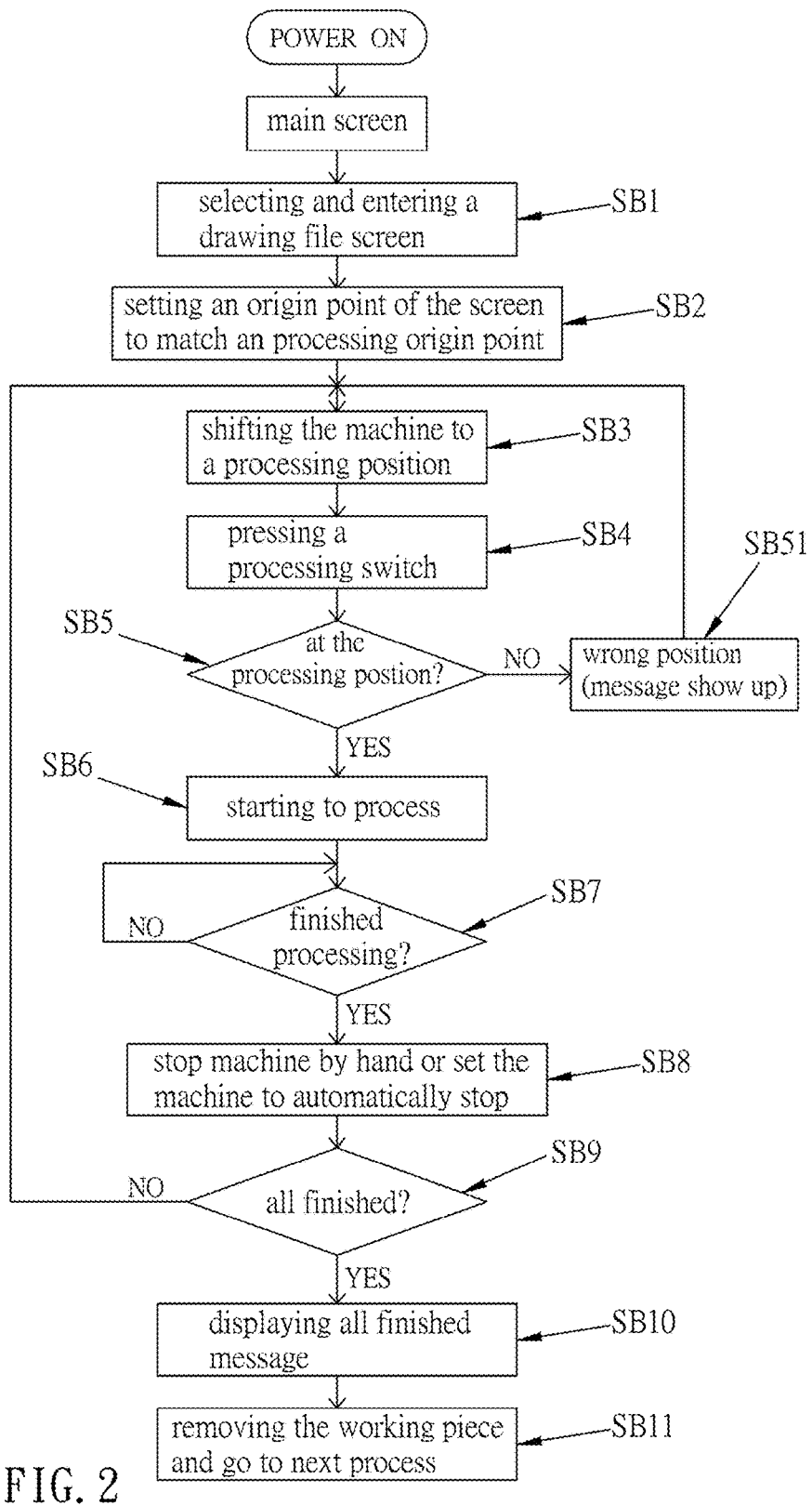
FIG. 2 is a flow chart of a processing method for processing machine according to present invention.

Please refer to FIG. 2, the processing method for processing machine of the present invention comprises a mode selection step SB1, a setting step SB2, a shifting step SB3, an activating step SB4, a first checking step SB5, a processing step SB6, a second checking step SB7, a stopping step SB8, a third checking step SB9, and a displaying an all processing finished message step SB10.

Figure 3:
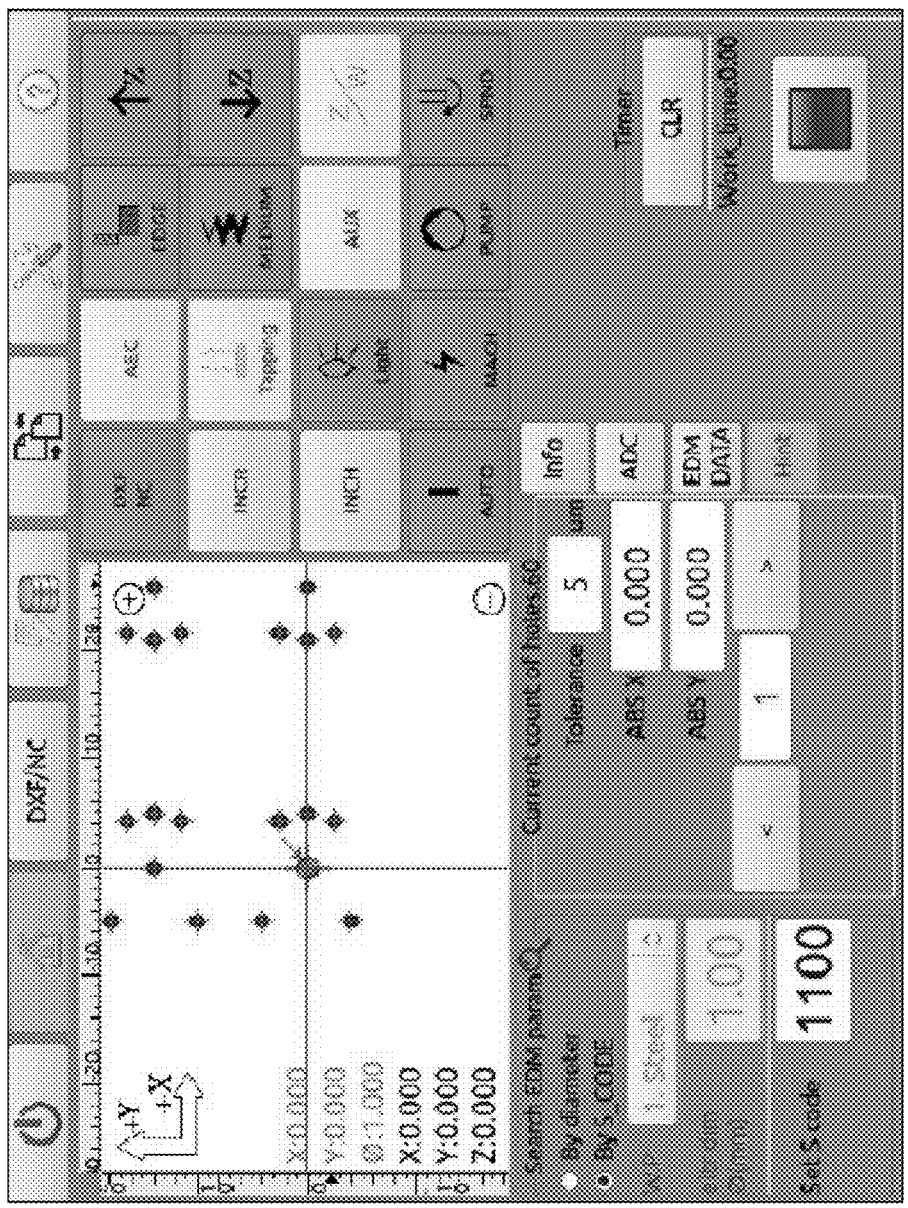
FIG. 3 is a view of the processing method according to present invention while showing a main screen.

The mode selection step SB1 is displaying a main screen (shown as in FIG. 3) on a monitor of a system of a system and selecting and entering a drawing file screen on the main screen. The tolerance shown on main screen is 5 μm. It means that the tolerance range between the reference point O1 and the reference point O2 and the processing coordinate D1 and the corresponding processing point D2. It may be set according to the precision of the work piece waited for processing before being operated by users. The processing may be performed while the tolerance range is set. Otherwise, the processing may be not performed while it is out of the tolerance range so as to prevent from error processing and improve yield rate.

The setting step SB2 is setting a preset reference point O1 to match a reference point O2 of a work piece waited for processing. A processing file D3 (shown as FIG. 4) is selected. The processing file is stored a plurality of processing coordinates D1 (shown as in FIG. 6). The work piece waited for processing is setting a plurality of processing points D2 (shown as in FIGS. 4 and 6).

At the same time, it checks if the preset reference point O1 and the is reference point O2 of the work piece waited for processing are matched before operating preliminarily by operator and checks if each processing coordinate D1 is correct, but not limited thereto. It may further include setting parameters, such as a processing aperture and depth. The screen may be mirroring, rotating, or angularly adjusting.

Figure 9:
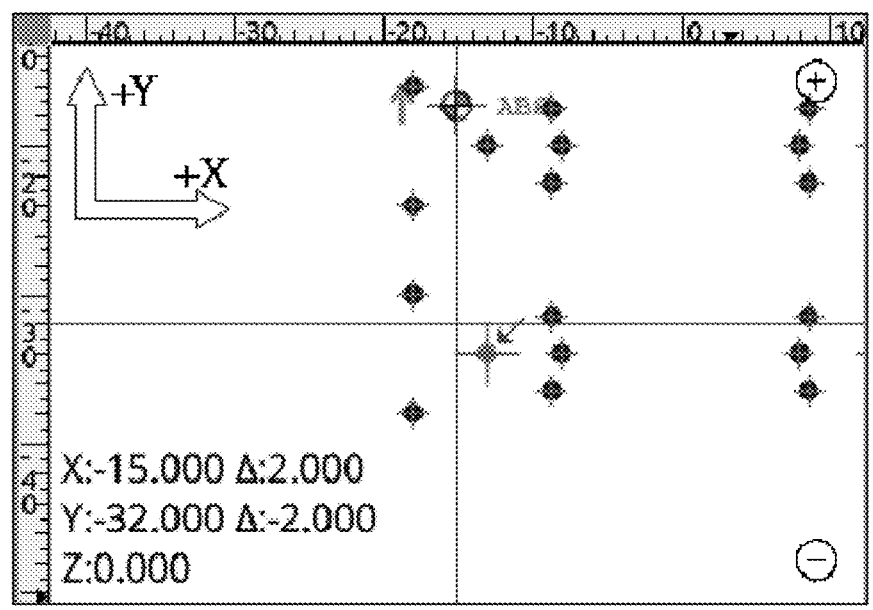
FIG. 9 is a view of the processing method according to present invention while the main screen shows that one of the processing coordinate is shifted to next processing point.

The shifting step SB3 is shifting each processing point D2 to corresponding processing coordinate D1 (shown as in FIG. 9) with operator and changing the color of the coordinate to green (the position allowed for processing). The shift of the work piece waited for processing may be only followed the shifting direction on the drawing file screen. It means that the processing point is overlapped and matched the corresponding processing coordinate but not necessary to read the coordinate value so as to prevent from misjudging or reading wrong coordinate value.

The activating step SB4 is pressing a processing switch to transmit an activating signal to the processing machine so as to activate the processing step SB6.

Figure 7:
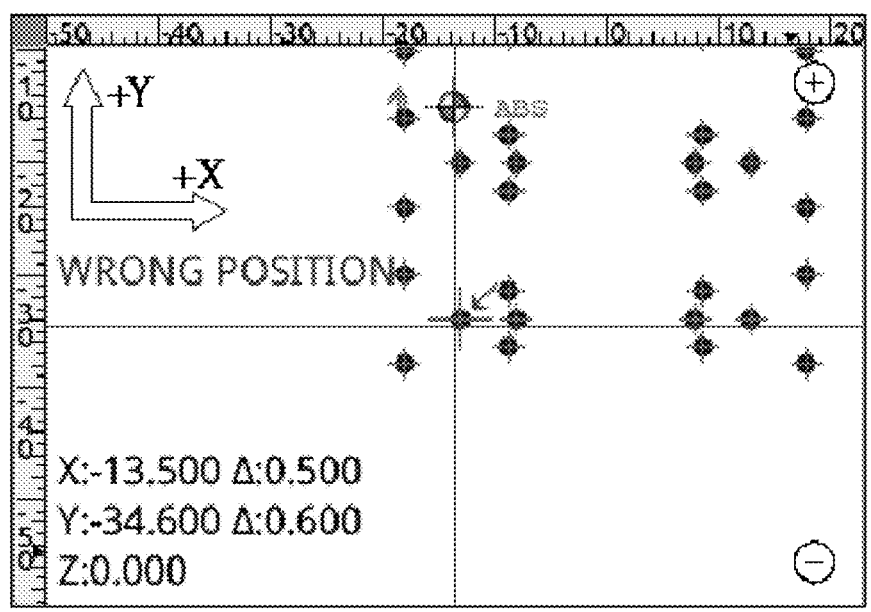
FIG. 7 is a view of the processing method according to present invention while the main screen shows that one of the processing coordinates is not matched the corresponding processing point and alarmed with red color.
Figure 8:
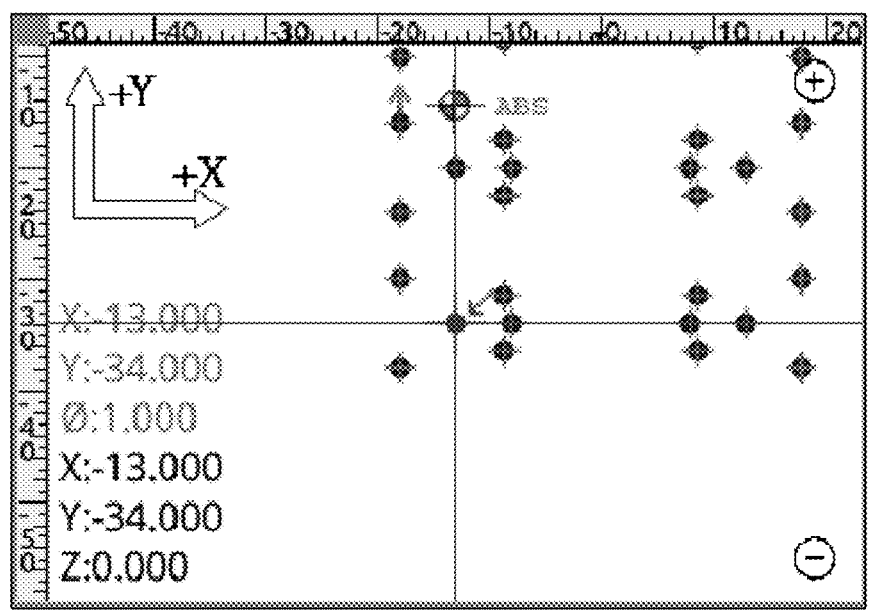
FIG. 8 is a view of the processing method according to present invention while the main screen shows that one of the processing coordinate and the corresponding processing point are in position and changed to green color.

The first checking step SB5 is checking if the work piece waited for processing is matched at a correct position which is one of the processing coordinate. If no, an error message (shown as in FIG. 7 and step SB51 in FIG. 2) is displayed on the main screen and simultaneously the processing is stopped so as to go back to step SB3. If yes, go to next step (shown as in FIG. 8). The first checking step SB5 is detecting with an optical encoder or an encoder, and further it may use a step motor to count the steps to obtain the coordinate information.

The processing step SB6 is that the work piece waited for processing is started to process by the processing machine.

The second checking step SB7 is checking if the work piece is finished processing at the corresponding processing coordinate D1. If no, got back to the step SB6. If yes, go to next step.

The stopping step SB8 is stopping the processing step SB6 of the processing machine.

The third checking step SB9 is checking if each processing coordinate D1 of the processing file D3 and the corresponding processing points D2 of the work piece waited for processing are finished processing. If no, go back to step SB3. If yes, go to next step.

Figure 10:
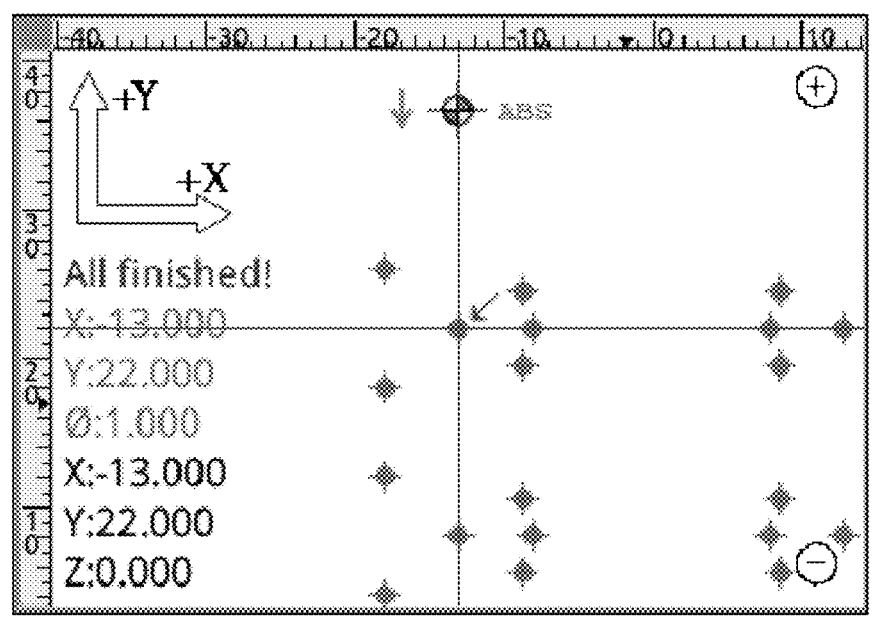
FIG. 10 is a view of the processing method according to present invention while the main screen shows that all processing coordinates and all processing points are finished processing and displayed an all processing finished message.

The step SB10 is displaying an all processing finished message (shown as in FIG. 10) on the drawing file screen of the main screen.

Finally, the work piece which is finished processing is removed and goes to next step (step SB11).

Figure 4:
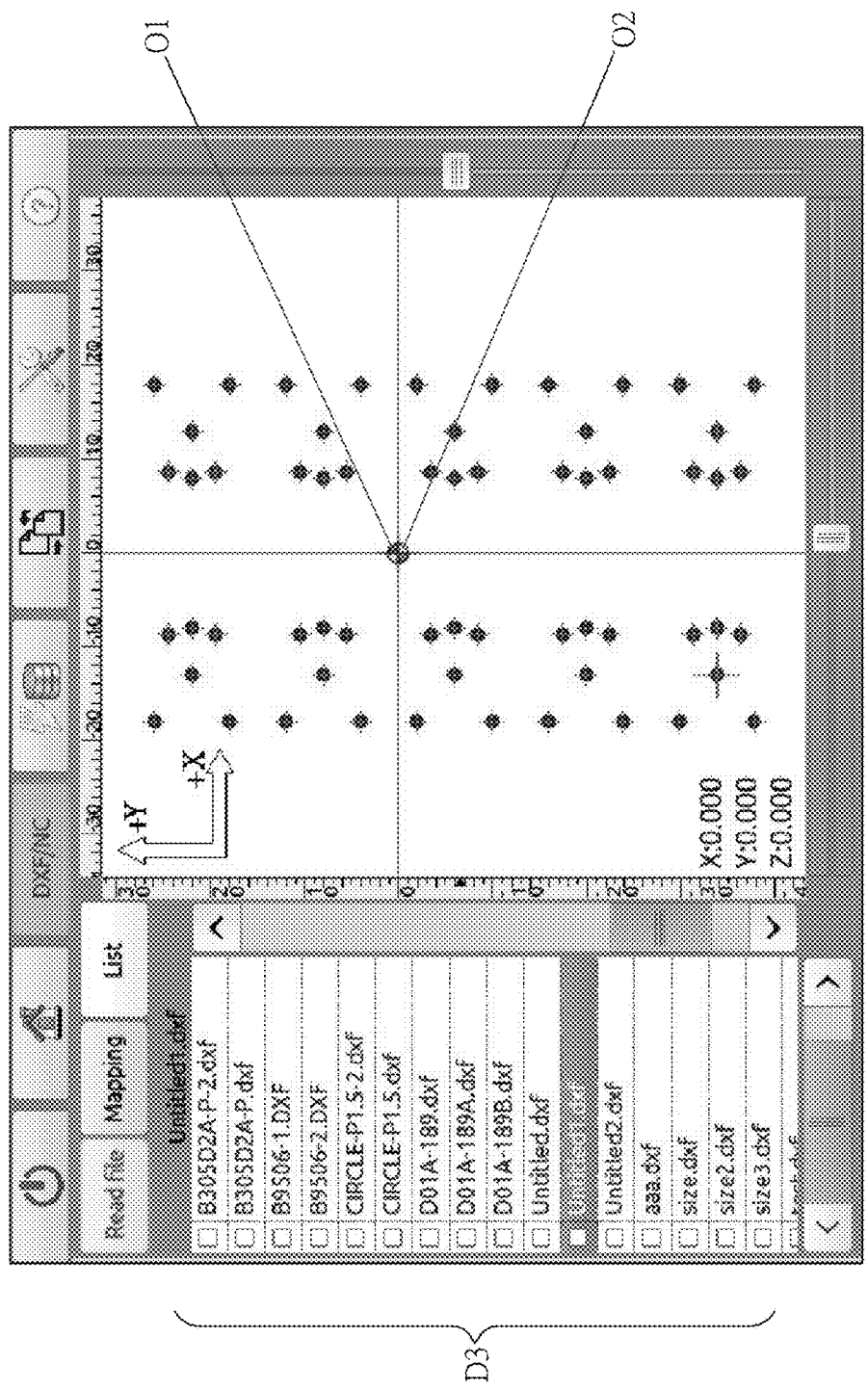
FIG. 4 is a view of the processing method according to present invention while the main screen is switched to a file selection screen.
Figure 5:
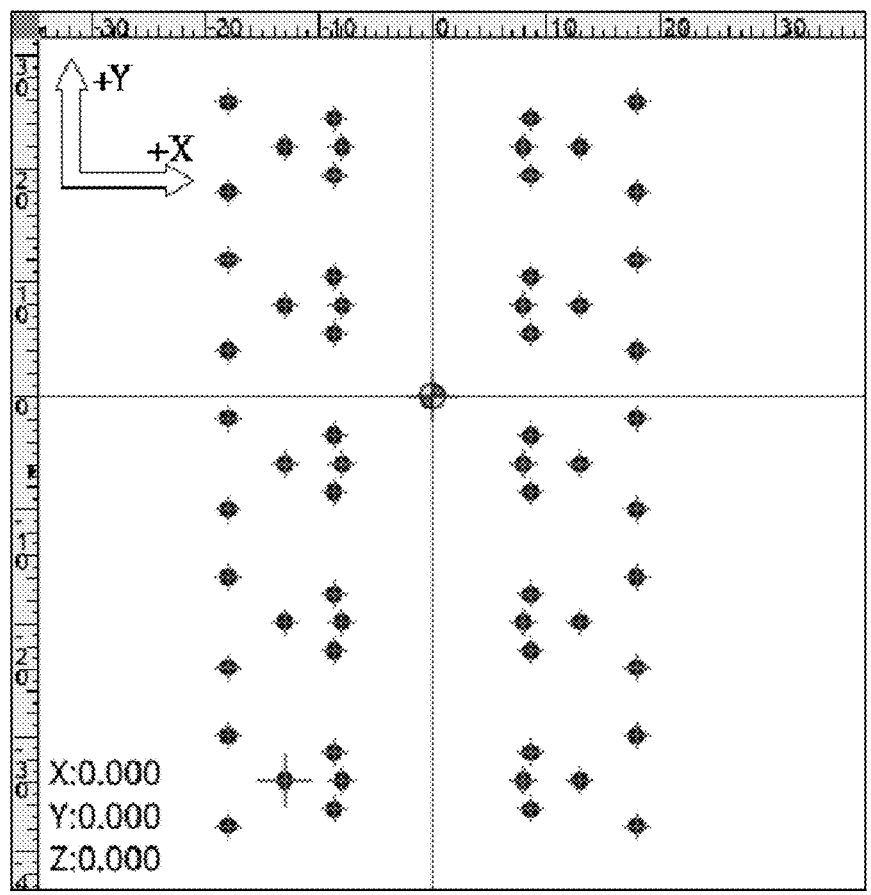
FIG. 5 is a view of the processing method according to present invention while the main screen is switched to a screen for positioning and aligning with a reference point.
Figure 6:
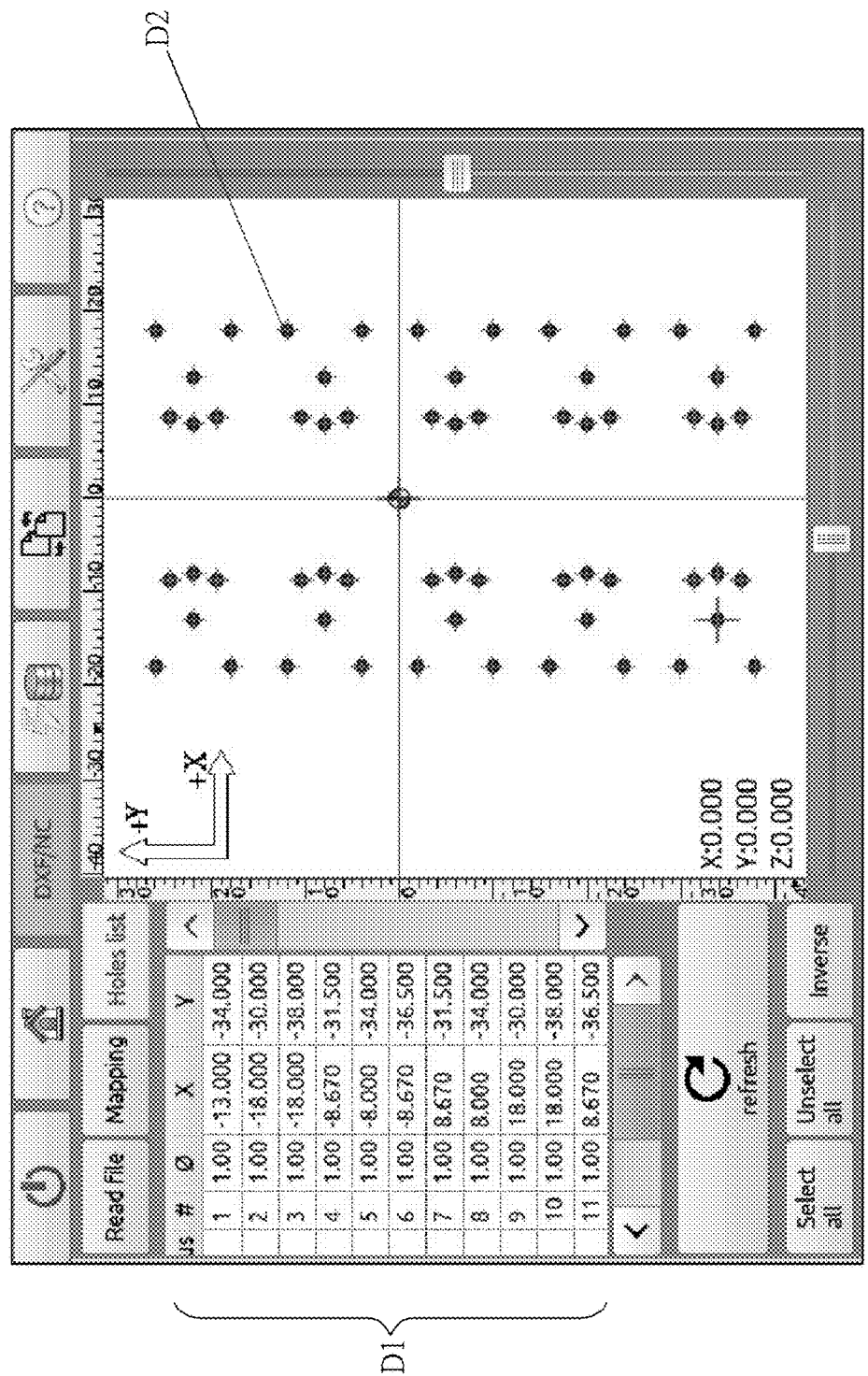
FIG. 6 is a view of the processing method according to present invention while the main screen is switched to a screen which shows all processing coordinates of the processing file and all processing points of a work piece waited for processing.
Figure 11:
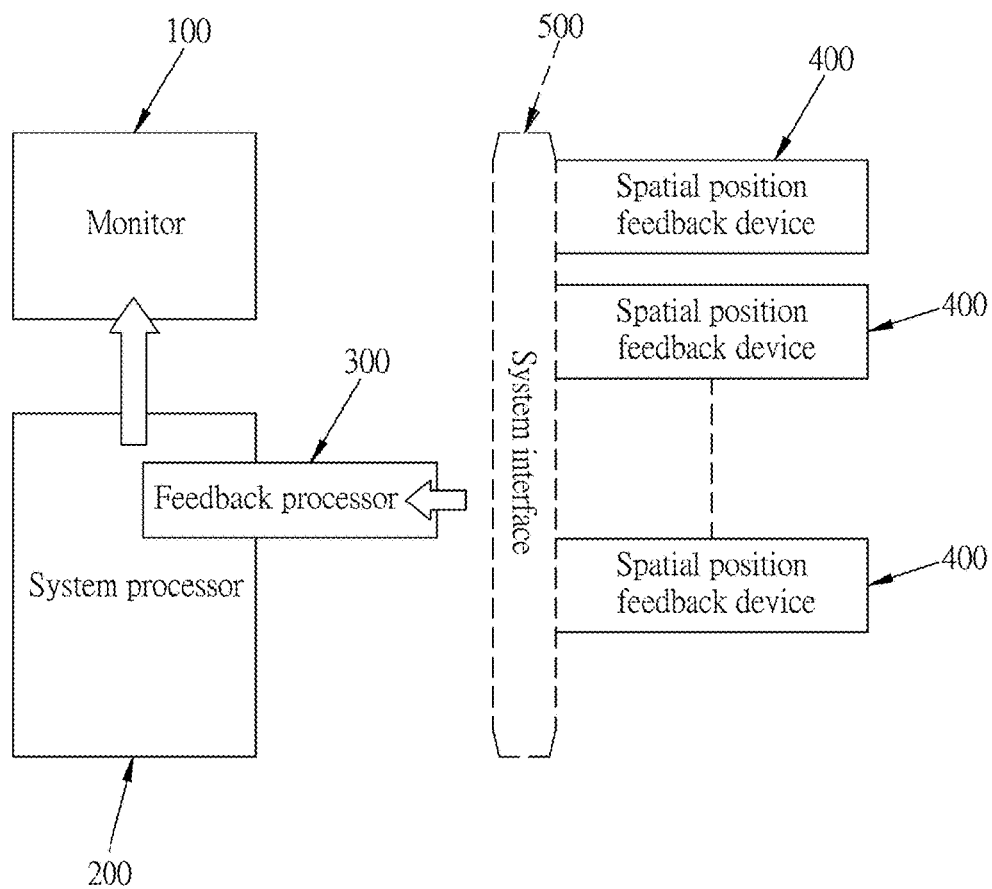
FIG. 11 is a block diagram of the processing machine according to present invention.

The structure of the system is shown as in FIG. 11 (and reference to FIGS. 4 and 6). A monitor 100 is displayed the data which is wanted to be shown by the above mentioned steps. A plurality of spatial position feedback devices 400 controlled by a system interface 500 is detecting the positions of the work piece waited for processing and the processing point D2. The positions which are detected are feedback to a system processor 200 by a feedback processor 300. The system processor 200 compares teach processing coordinate D1 of the processing file D3 with the corresponding points D2 of the work piece waited for processing and shows on the monitor 100 to achieve the effect of alignment. Accordingly, the spatial position feedback devices 400 of the system is transmitted the shifting direction of the drawing file screen to the feedback processor 300 with the system interface 500 so that the system processor 200 may be displayed the shifting status on the monitor 100.

According to above mentioned method, the operator may shift or move the work piece waited for processing by hand directly or selecting an automatic mode to automatically operate. Checking if the processing points of the work piece waited for processing are overlapped the corresponding processing coordinates may be known directly from the drawing file screen of the main screen. After making sure that the processing points of the work piece waited for processing are overlapped the corresponding processing coordinates, the shifting step is performed by hand or operating in automatic mode through the coordinates of the processing file. The processing step is working while the processing coordinates are matched the corresponding processing points. It may reduce defect rate, and further make sure that all processing points are finished processing.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A machining method for machine tools comprising:
   displaying a drawing file on a monitor of a machine tool;
   setting an origin point of the drawing file to match an origin point of a workpiece within a tolerance;
   setting a plurality of reference points of the drawing file to match a corresponding plurality of reference points of the workpiece within the tolerance;
   selecting a processing file which includes a plurality of processing coordinates stored in the processing file;
   initially checking if the origin points of the drawing file and of the workpiece are matched within the tolerance;
   moving the workpiece so that each of the workpiece reference points is shifted to a corresponding one of the plurality of processing coordinates, wherein a shift of the workpiece the workpiece is detected by the machine tool and a shift direction thereof is displayed on the monitor so that a given workpiece reference point and the corresponding processing coordinate are overlapped and matched within the tolerance to inhibit misjudging or reading incorrect coordinate values;
   performing the machining operation, wherein a processing switch is pressed to transmit an activating signal to a system processor of the machine tool to initiate a processing step;
   executing a first checking step by checking if the workpiece location is matched, within the tolerance, at a corresponding position of one of the processing coordinates: if not, showing an error message on the monitor, not performing the processing, and the moving step must be finished by an operator; if yes, proceeding;
   executing the processing step of the workpiece by the machine tool;
   executing a second checking step by checking if the machine tool finishes the processing of the workpiece at the corresponding processing coordinate: if not, continue the processing step; if yes, proceeding;
   executing a stop step of stopping the processing of the machine tool;
   executing a third checking step by checking if all processing coordinates of the processing file and the corresponding all reference points of the workpiece are completed processing: if not, return to the moving step; if yes, proceeding; and
   displaying a completed status when operations on all reference points of the workpiece are completed.

2. The machining method of claim 1, comprising changing display of the processing coordinates in different colors to confirm the processing is ready, otherwise disabling the machine tool from activating the processing step while the processing point of the workpiece is moved to the corresponding processing coordinate in the moving step.

3. The machining method of claim 1, comprising employing one or more of an encoder and a stepping motor during movement of the workpiece and displaying a corresponding movement status.

* * * * *